Figure 1:
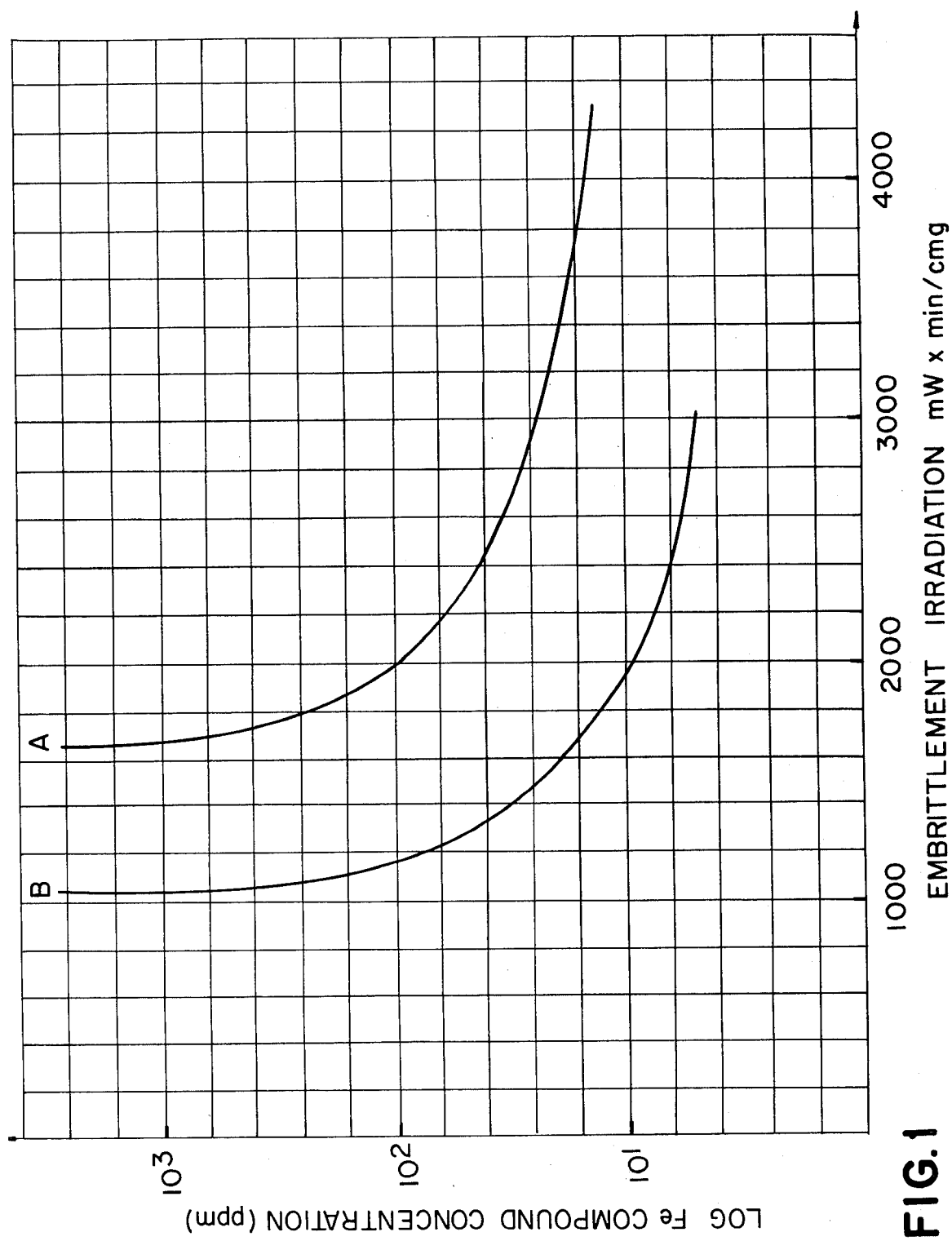

United States Patent [19]

Gilead et al.

[11] Patent Number: 4,461,853

[45] Date of Patent: Jul. 24, 1984

[54] CONTROLLABLY DEGRADABLE POLYMER COMPOSITIONS

[76] Inventors: Dan Gilead, Kibbutz Hazorea, Israel; Gerald Scott, 338 Station Rd., Knowle, Solihull, West Midlands B93 OET, England

[21] Appl. No.: 503,629

[22] Filed: Jun. 13, 1983

Related U.S. Application Data

[63] Continuation of Ser. No. 304,663, Sep. 22, 1981, abandoned, which is a continuation of Ser. No. 940,726, Sep. 8, 1978, abandoned.

[30] Foreign Application Priority Data

Sep. 21, 1977 [IL]  Israel ........................................ 52974

[51] Int. Cl.$^3$ ........................... C08K 5/47; C08K 5/43; C08K 5/39; C08K 5/34
[52] U.S. Cl. ..................................................... 523/126
[58] Field of Search ........................................ 523/126

[56] References Cited

U.S. PATENT DOCUMENTS 4,101,720  7/1978  Taylor et al. ............................ 526/3
4,121,025 10/1978  Scott ........................................ 526/4

FOREIGN PATENT DOCUMENTS 1356107  6/1974  United Kingdom .

OTHER PUBLICATIONS

Hawkins et al., "Degradation and Stabilization"–Crystalline Olefin Polymers, Part II, vol. XX in High Polymers Series, editors: Raff and Doak, p. 382 (1964).
J. C. Cowan et al., "Flavor Reversion and Related Forms of Oxidative Deterioration" Autoxidation and Antioxidants–vol. II, Lundberg (1962) pp. 608–614.
Gerald Scott "Delayed Action Photo-Activator for the Degradation of Packaging Polymers"–Polymer Science and Technology–vol. 3, Polymers and Ecological Problems–James Guillet (Editor) 1973, 27–44.

Primary Examiner—Veronica P. Hoke
Attorney, Agent, or Firm—McGlew and Tuttle

[57] ABSTRACT

The invention relates to controllably degradable polymer compositions, especially suitable for making film products, comprising a vinyl polymer, and at least one first complex which is a non-ionic organosoluble antioxidant complex of a chain-breaking, peroxide-decomposing, metal ion deactivating or ultraviolet light stabilizing compound and of a metal such that the metal complex is a photoactivator and at least one second complex which is a non-ionic organosoluble ultraviolet light stabilizing complex of a metal such that the metal complex is a photostabilizer, the concentrations of the two complexes being co-ordinated to produce a desired embrittlement time for the composition.

The first complex is an iron complex and the second a nickel complex or a cobalt complex.

8 Claims, 2 Drawing Figures

CONTROLLABLY DEGRADABLE POLYMER COMPOSITIONS

This is a continuation of co-pending U.S. application Ser. No. 304,663 filed Sept. 22, 1981 which in turn is a continuation of co-pending U.S. application Ser. No. 940,726 filed Sept. 8, 1978, both now abandoned.

THE PROBLEM AND THE PRIOR ART

It is known to add to polymer compositions, generally vinyl polymers or copolymers, typically polyolefins, substances which are degradation promoters and cause the breakdown of the composition, with the formation, preferably, of biodegradable oxidation products. The resulting compositions are useful for, for example, packaging materials, which after they have been used, will thus give rise to degradable refuse.

Thus British Patent Specification No. 1,356,107 describes vinyl polymer compositions containing a complex of a transition metal, preferably iron, which is activatable by light of wavelength of less than 330 nm, U.V. radiation. The complex can be formed in situ from the so-called complexing agent and a salt of the metal. In the concentrations used the complex makes the composition stable in the manufacturing process in which it is brought to the molten state, usually extrusion or blow extrusion, and during use indoors, typically as a packaging material, whereafter the material is disposed of and exposed to sunlight, which, after a certain induction period, activates the said metal compound which then produces relatively rapid degradation, no longer requiring exposure to UV radiation.

While it is obvious that the induction period may vary widely, no means are known for precisely predetermining and controlling it. It is suggested that the antioxidants tend to increase the induction period while an increase in the concentration of the activatable metal compound tends initially to decrease it but after a certain point seems to increase it, such that one can control the induction period by a suitable balance of metal salt and complexing agent or metal restrainer concentration, but the results have not proved satisfactory for certain end uses. This is because very small changes in concentration can produce very large changes in the lifetime of the polymer.

Whereas with packaging material no very precise control is required since generally these are not exposed to radiation of the critical wavelength as long as they are in use, or at least can easily be protected therefrom so that their useful life will be as long as may be desired, this is not the case with, say, mulching film where it is desired that the lifetime of the film can be controlled very precisely.

In agriculture, wide use is made of crop protection or mulching films. Such films must perform their service, viz. cover, enclose or protect, the soil and/or the growing crops, under fully exposed outdoor conditions, for a given period of time or better, from a given time to another given time of the year. Subsequently, certain agricultural operations, such as ploughing or gathering of the crop, must take place, and the films constitute an obstacle to such operations and must be removed. Except for some cases in which the film can be re-used and is worth recovering, removal is a time consuming and costly operation. With existing formulations one either has to use a polymer composition which will have an induction period as long as the time during which the film is exposed to sunlight, or longer, in which case removal of the film may still be necessary; or to use a quickly degradable composition that will degrade before its service period is over, in which case the film will not carry out its protective function for the whole period during which it is required. Further since the degree of effective UV radiation absorbed by the film will certainly depend on the location at which it is used, on the season in which it is laid down, and on the period of exposure, and may depend on other factors as well (since the amount of information available in the art in this respect is but scant), it appeared impossible, to define a type of film that would be capable of service under the most varied geographical and agricultural conditions which exist in practice.

A film of a degradable polymer will pass, upon being exposed to UV radiation, through a plurality of degradation stages, including a stage which is called "embrittlement" in which the film maintains its form and continuity and therefore its protective character, substantially unaltered, but in which it will easily be broken up by the mechanical action of a soil tilling or cultivating implement, e.g. a plough or harrow or cultivator. The embrittlement stage is characterised by an elongation at break substantially equal to zero. For a given geographical location and film laying out season, the time required for reaching the embrittlement stage i.e. "the embrittlement time" is a function of the total amount of UV radiation to which the film has been exposed, so that for practical purposes all other factors may be neglected and it is possible to determine beforehand, based on simple experimental tests, the time at which the film, while still giving its full protective service, has reached the stage at which it can be eliminated by working the soil in an ordinary way.

GENERAL DESCRIPTION

We have surprisingly found, according to the present invention, that the time to embrittlement can be predetermined and varied at will, with considerable precision, especially in polyolefin films, by having present in the product carefully controlled amounts of a metal, for example iron, complex of the type described in the above-mentioned British Specification in combination with an ultra-violet light stabilising complex of, say, nickel. This is all the more surprising, since iron compounds alone and nickel compounds alone, while both influencing the embrittlement time, do not permit to control and predict this latter with precision, so that there appears to be an unexplained synergistic effect between the two types of metal complex which is not merely quantitative, as synergistic effects invariably are, but is qualitative, resulting not merely in an enhancement of a certain property, but in a complete change of behaviour. Because of this, while the word "synergistic" will be used for want of a better one, it should be understood that it does not really describe the phenomenon, which is much more fundamental and unusual than the word might suggest.

The individual functions of the two types of metal complex typified by the iron complexes referred to in the aforementioned British Patent Specification and those typified by the nickel complex which may be a complex of the same ligand, differ in that the former are powerful activators of UV degradation of a variety of polymers after a relatively short induction period whereas the latter are UV stabilisers; that is they give a relatively long induction period before UV degradation commences and the subsequent rate of photo-degradation is very slow. This difference in behaviour is in turn associated with the UV instability of the former and the UV stability of the latter.

According to the present invention there is provided a vinyl polymer composition which comprises at least one non-ionic organosoluble antioxidant complex of a chain-breaking, peroxide-decomposing, metal ion deactivating or ultraviolet light stabilising compound and a metal, for example iron, manganese or cerium which in combination with the compound gives rise to a photoactivator and at least one non-ionic organosoluble ultraviolet light stabilising complex of a metal, for example nickel, cobalt or copper, such that the metal complex is a photostabiliser, the concentrations of the two metal complexes being co-ordinated to produce the desired embrittlement time for the composition.

The compositions of the present invention are particularly useful for the production of films, especially mulching films, but it will be appreciated that the compositions can also be used for a variety of packaging usages.

In the case of mulching film it is to be understood that after the embrittlement stage has been reached, if the film is allowed to remain on the soil and is not interfered with, its degradation will proceed and it will finally disintegrate altogether. In some cases it may be desired to operate in this way. Thus the soil need not be worked at the time at which the embrittlement stage of the film has been reached, or shortly thereafter, but only after the degradation has proceeded, optionally until substantially complete disintegration of the film. According to the present invention there is also provided a process, comprising laying out a protective or mulching film of the present invention in an agricultural area, allowing it to lay in the area, for example field, at least until it has reached its embrittlement stage, and then eliminating it, in the course of a conventional soil working operation, from the soil surface. Using the compositions of this invention it is possible to provide a film which will maintain its physical continuity and thereafter exert its protective activity for the whole of the desired period, and yet not only will not interfere with subsequent operations, e.g. ploughing, but actually will in fact be eliminated by those operations without the need of any change in them.

The process of this invention can also be applied to the production of fibres, nets and twines of accurately controlled lifetime from fibre-forming polymers, particularly high density polyethylene, polypropylene and blends and copolymers of these and the polyamides and polyesters.

The vinyl polymers are film- or fibre-forming homo- or co-polymers, particularly polyolefins, and more particularly polyethylene, both high density and low density as well as polypropylene. Other vinyl polymers include poly(4-methyl-1-pentane), polystyrene, polyvinyl acetate, polyvinyl chloride, polymethyl methacrylate, and polyacrylonitrile and their copolymers including graft copolymers with unsaturated polymers, as well as mixtures of such polymers, particularly with unsaturated polymers.

In the case of polypropylene in the form of fibres or films, in particular, it is found possible to accurately control the lifetime of the product from a small proportion of its normal lifetime (i.e. without UV activators or stabilisers) to over fifty times the normal lifetime and yet have a very sharp change from a tough and strong product to a brittle and fragile product at the end of the desired life.

Although the preferred additives, which may be present, are thermal antioxidants and normally provide stability during processing, conventional antioxidants such as 1,1,2-tris-4-(2-tert-butyl-4-hydroxy-5-methyl)-phenylpropane may optionally be used to provide additional stability during film or fibre forming operations.

The film forming technique, for example extrusion, especially tubular blow extrusion, however, is conventional and is not a part of the invention. The antioxidant itself plays no part in determining the embrittlement time and is therefore used in conventional amounts. Inert pigments, dyes and other conventional additives may also be added to the polymer if so desired. In general pigments act as UV screening agents and increase the embrittlement time of the polymer. This is particularly true of carbon black, but a variety of white or light-coloured pigments may be used successfully.

The preferred combinations use complexes of iron and nickel and the subsequent discussion will refer to these metals for convenience. It will however be appreciated that precisely analogous comments apply to the other complexes.

The concentration of the iron complex is generally from 0.0005 to 0.5% by weight (5 to 5000 ppm), preferably from 0.0005 or 0.001 to 0.2% by weight and more particularly from 0.001 to 0.05% by weight. The concentration of the nickel complex is generally from 0.0005 or 0.01 to 0.2 or 0.5% by weight, for example from 0.01 to 0.15% or 0.05 to 0.5%, preferably from 0.1 to 0.2% by weight. Of course, the molecular weight of the complexing agent will affect the concentration of metal, which is the controlling factor; the above figures are specifically related to the dialkyldithiocarbamates such as dibutyldithiocarbamate.

The relative concentrations to be used of the two metal complexes depends largely on the intended use of the finished article. In general, on increasing the concentration of iron complex one obtains a more complete induction period (during which stabilisation is enhanced) and a sharper change from stabilisation to degradation. The effect of the nickel complex is to extend the complete induction period such that it can be shorter or, if desired, longer than the natural lifetime of the polymer. Naturally, a sharp or sudden change in the behaviour of the combination is particularly valuable where mulching film is being produced since for this particular utility one knows the length of time for which the film is required at the end of which time one wishes to dispose of it as simply as possible.

In general, a high nickel concentration combined with a low or medium iron concentration will give rise to a long induction period followed by rapid photoxidation. Such considerations would apply where cropping takes place after a relatively long period, say after 6 to 9 months. With a high iron concentration and a low nickel concentration there is a short induction period but a very sharp change in the behaviour at the end of this induction period. It will be appreciated that the lower the concentration of the nickel complex the shorter the induction period becomes and, in consequence, small changes in the iron concentration significantly affect the stability of the product.

The total amount of irradiation to which the unit surface of film is exposed until embrittlement is reached, furnishes a good definition of the film's behaviour. Different periods of time may correspond to the same amount of total irradiation, depending on the geographical location and on the season. While such periods will be given hereinafter also in terms of days, it will be obvious that the total amount of irradiation is a more convenient or significant parameter. The total amounts of irradiation given below refer to radiation of wavelength below 3150 Angstrom, and no differentiation is made or need be made between global, direct and diffuse UV irradiation. A useful general discussion of the subject of UV irradiation is found in J. Appl. Pol. Sc., Vol. 20, 1165-1174 (1976).

Figure 2:
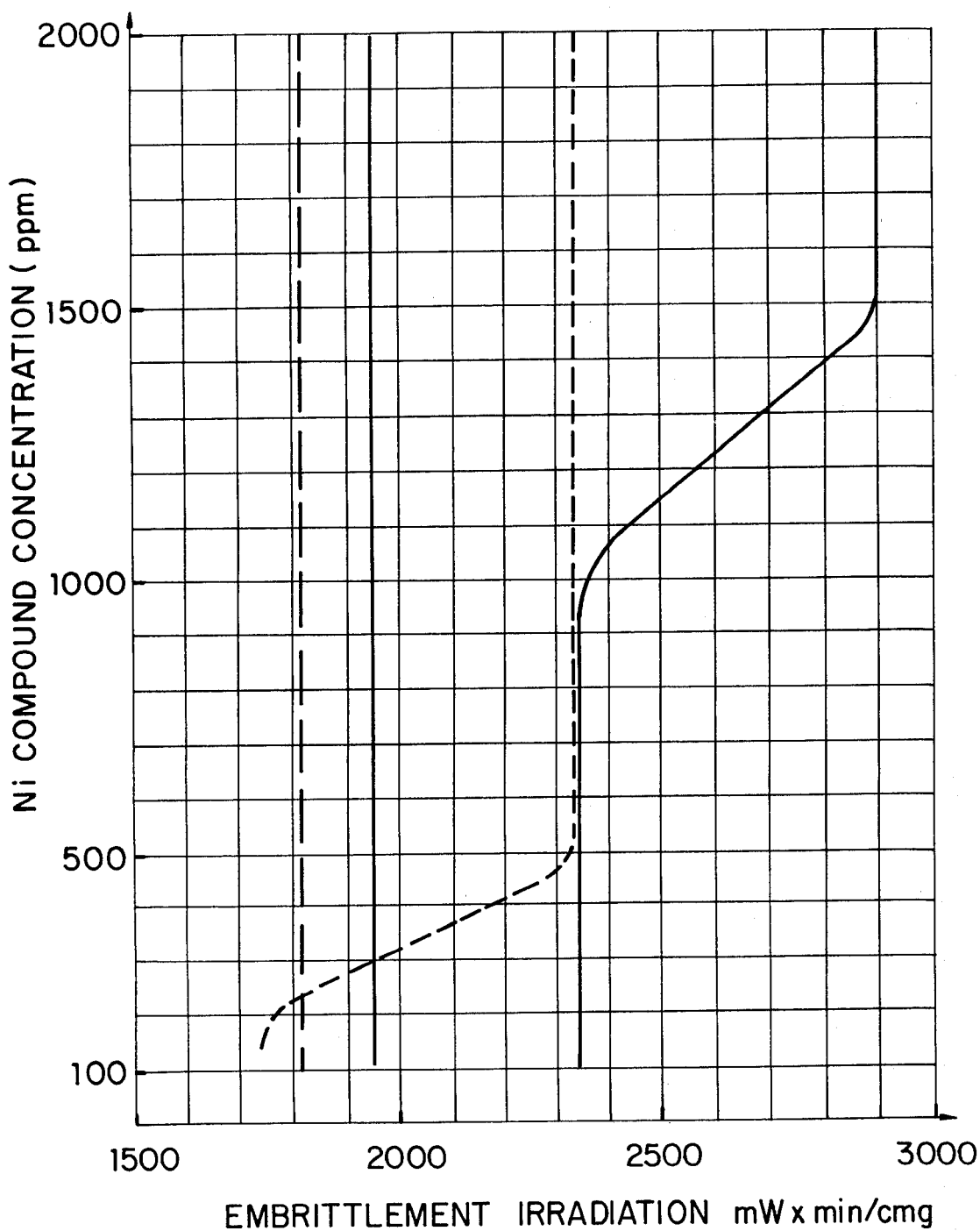

To describe the combined effect of metal concentrations in the compositions better, reference will now be made to the Figures in the accompanying drawings, wherein:

FIG. 1 is a diagram illustrating the effect of a change in the concentration of the iron compound, specifically iron dimethyldithiocarbamate for a constant given concentration of the nickel compound, specifically nickel dibutyldithiocarbamate, the abscissa representing the total amount of irradiation required for the film to reach the embrittlement stage (in mWx min/cmq) and the ordinate being proportional to the logarithm of the concentration (in parts per milion) of the iron compound; and FIG. 2 is a similar diagram illustrating the effect of varying nickel compound concentrations at constant iron compound concentrations, wherein, however, the ordinate is proportional to the actual concentration of the nickel compound.

The irradiation is expressed in all cases as microwatts $\times$ min/cm$^2$, and the concentrations as ppm.

With reference to FIG. 1, the chosen nickel compound concentration is 1000 ppm; however the general form of the curves would not change if another nickel compound concentration were chosen. Curve A refers to a film that was laid out on January 1st and curve B to a film that was laid out on September 22nd, both at latitude 32° North. The films were unshaded throughout: obviously if they had been shaded by existing vegetation or by growing crops, they would have required a longer time to receive the same amount of irradiation.

It can be seen that the curves are roughly hyperbolical in shape. Below iron compounds concentrations of 5-10 ppm, this metal is practically ineffective and the curves approach the horizontal. Above a certain limit, about 1000 ppm, increased concentrations are ineffective and the curve becomes vertical. Between the said maximum and minimum concentrations, the effect of a change in iron compound concentration is very marked and precise. This range is referred to herein as the "control range"; concentrations above the control range can be used but are wasteful. It can also be seen that while the film laying out data has an influence on the embrittlement irradiation i.e. the amount of irradiation at which embrittlement is reached, viz. the abscissa of the diagram, as was to be expected since other climatic factors intervene, it has no effect on the shape or the curve, and therefore once the behaviour of a film at any concentration of iron is known for a certain season, it is known, or, can be extrapolated, with respect to any concentration.

FIG. 2 shows the behaviour of films having varying nickel compound concentrations and two fixed iron compound concentrations—50 ppm for the curves in full lines and 100 ppm for the curves in broken lines, for two laying out dates: March and August. Referring firstly to the March laying out date, it is seen that when the iron compound concentration is 50 ppm, nickel compound concentrations above 1500 ppm do not affect the embrittlement irradiation, viz. the curve is vertical. Between about 1500 and 1000 ppm, the embrittlement irradiation increases markedly with the nickel concentration: this representing therefore the nickel control range. Below the control range, the curve becomes vertical once again.

The March curve referring to iron compound concentration of 100 ppm, has a similar shape, but the control range is at lower nickel concentrations. Between 500 and 1000 ppm the two March curves overlap, although in the Figure they have been drawn side by side for the sake of clarity.

As the laying out season shifts to August, embrittlement irradiations decrease and nickel compound concentrations from as little as 100 to as much as 200 ppm no longer have any significant influence on the embrittlement irradiation. The curves become wholly vertical, and, in appearance, there is no control range. It is however believed that the control range may have shifted downwards to lower nickel concentrations, so small that the effect is hard to detect, and which are not useful since any desired lower embrittlement irradiation can be obtained, within certain limits, by increasing the iron concentration, as shown in FIG. 1. It is believed that this phenomenon may perhaps explain why the existence of control ranges has not previously been discovered.

It is to be noted that even when the nickel compound concentrations are not in the nickel control range, viz. when one operates in the zones of the straight lines in FIG. 2, a variation of the nickel compound concentration is not irrelevant inasmuch as it influences the control range of the iron compound, viz. leads to a shift of the curves of the type of FIG. 1. There is no need therefore to operate in the control ranges of both metals; cleraly, however, it is desirable to operate under conditions in which at least one of the two metal compounds has concentrations within its control range at the given concentration of the other compound. This is an unexpected and surprising phenomenon; it is one aspect of the qualititative synergistic relationship between the two metals.

The concentration and concentration range data which have been and will be furnished herein, are substantially valid for all the metal complexes which may be used. Practically such compounds should be stable under the processing conditions, have a low volatility, and be reasonably accessible and not too expensive. The quantitative data herein furnished can be transferred from one compound to another, particularly in relation to the alkyl-thiocarbamates, by simple stoichiometric calculations, which allow to reproduce with different compounds, substantially the same metal concentrations.

The preferred iron, manganese and cerium complexes used in the compositions of the present invention may be any of the antioxidant complexes mentioned in the aforesaid British Specification; Thus the ligand atoms may be, for example, nitrogen, sulphur, oxygen or phosphorus, especially trivalent phosphorus, sulphur being preferred. Generally the ligand atoms of the complex are oxygen, nitrogen or sulphur, at least one bein nitrogen or sulphur, or an oxygen directly attached to an aryl radical. Examples of suitable complexing agents include mono- and polyamines, in particular arylamines, oximes, alcohols, thiols, phenols, thiophenols, phosphoric, phosphonic and phosphorus esters and amides and their thio-analogues, ketones, thioketones, and amides and their thio-analogues, hydrazines, hydrazones, Schiff's bases, and azo compounds.

The metal complexes of the following complexing agents (which, however, do not necessarily exist in the free state) are generally preferred for use in the compositions of the present invention:

(i)
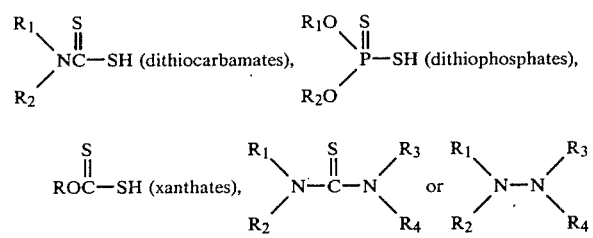

wherein R, $R_1$, $R_2$, $R_3$ and $R_4$ each represent hydrogen or an alkyl, aralkyl or aryl group or a substituted alkyl, aralkyl or aryl group, which may be linked together to form, with the nitrogen atom shown, a heterocyclic ring such as diisopropyl thiophosphoryl monosulphide, diisopropyl thiophosphoryl disulphide, and trimethylthiourea; (ii) compounds such as tetramethylthiura disulphide:

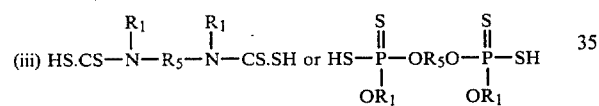

where $R_1$ is hydrogen, or an alkyl, aralkyl, or aryl group, or a substituted alkyl, aralkyl or aryl group, and $R_5$ is a divalent aliphatic, e.g. alkylene, aromatic, e.g. phenylene, or heterocyclic radical which may be polymeric:

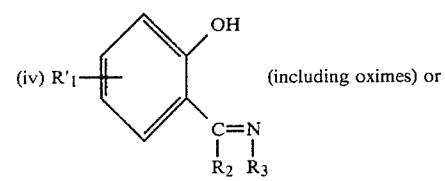

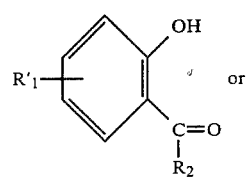

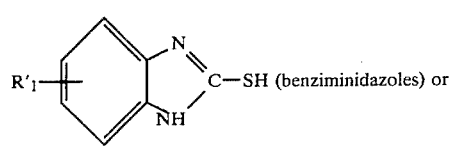

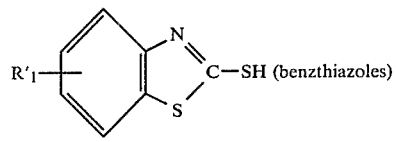

wherein $R'_1$ represents an alkyl, substituted alkyl, hydroxy or chloro group, or an alkylene radical linking two such aromatic groups, $R_2$ represents hydrogen, or an alkyl or aryl group or substituted alkyl or aryl group, $R_3$ represents a hydroxy, alkoxy, alkyl or substituted alkyl group including an ethylene or propylene bridge linking two such aromatic groups such as salicylaldehyde, di(salicylidene) ethylene diamine, 4-methyl-2-hydroxy-acetophenone oxime, mercaptobenzthiazole and mercaptobenzimidazole;

(v) aromatic amines, conventionally used as antioxidants and metal restraining agents, having the formula: Aryl-NH-Aryl, particularly when the aryl groups are themselves substituted, for example with hydroxy, amino and substituted amino groups;

(vi) substituted phenols and, particularly, polyfunctional phenols of formula:

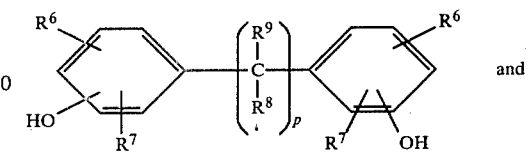

and

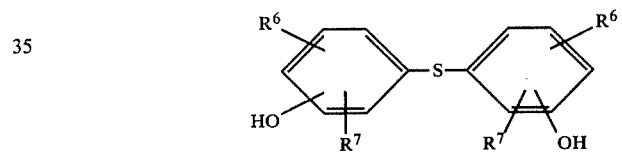

in which $R^6$ and $R^7$ are alkyl groups and $R^8$ and $R^9$ are hydrogen or alkyl substituted with complexing groups such as hydroxyphenyl and p is a positive integer. Typical phenols in this class include 2,2'-methylenebis[4-methyl-6-(1''-methylcyclohexyl)phenol], 1,1,2-tri-4(2-tertiarybutyl-4-hydroxy-5-methyl)phenyl-propane, tetra-[4-(2,6-ditertiarybutyl-3-hydroxy)phenyl-ethylcarbonyloxymethyl]-methane, 4,4'-thio-bis(2-tertiarybutyl-4-methyl)phenol and 2,2'-thiobis(4-methyl-6-tertiarybutyl)phenol, and (vi) cyclic phosphates of the type:

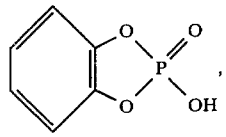

including ring substituted derivatives thereof.

The dithiocarbamates are particularly preferred because they are substantially non-toxic.

In the above mentioned complexing agents, it is preferred that the alkyl or alkenyl group contain not more than 6 and preferably not more than 4 carbon atoms, that aryl groups be phenyl and that substituents when present in these groups preferably be halogens such as chloro, $C_1$-$C_6$ alkoxy or a hydroxy or amino group.

Such complexes may be preformed before they are added to the thermoplastic polymer, or they may be produced in situ by reaction of an organo-soluble salt of a metal as aforesaid, for example, a carboxylate, e.g. a stearate, with a complexing agent which has already been added to the polymer. The complexing agent may be the UV stabilising additive in which the stabilising metal ion (e.g. Ni) is partially displaced in the complex by the activating ion (e.g. Fe) by a metathesis reaction giving a relatively inert salt of the displaced metal (Ni).

It is desirable to add the complexing or restraining agent first since, otherwise, some degradation can occur during processing and this, naturally, gives rise to complications.

The preferred nickel complexes are in general derived from the same ligands as the iron complexes, for example from the dithiocarbamates, dithiophosphates, xanthates, oximes, benzthiazoles, phenols and related compounds as mentioned above in connection with the iron complexes and they may in addition be complexed with additional co-ordinating ligands (e.g. amines). It will be appreciated that the majority of the nickel chain-breaking, peroxide-decomposing and metal ion deactivating complexes are also ultraviolet light stabilising complexes. However, the ligand for iron need not be the same as the ligand for nickel in any combination. Again the dithiocarbamates are particularly preferred as ligands for both metals.

The complexes (or an organic soluble form of the metal ion together with the complexing agent) can be introduced into the polymer in known manner by blending, kneading or milling, for example.

The thermoplastic compositions of this invention may contain other compounding ingredients, such as blowing agents, antioxidants, stabilisers, lubricants, antistatic agents and anti-blocking agents, as well as polymer-soluble polyconjugated dyestuffs such as $\beta$-carotene and azo dyes which are sensitive to the chemical conditions prevailing at the onset of rapid disintegration of the polymer.

It should also be noted that, operating under field conditions, some scattering of results due to random factors and some occasional anomalous results may be found. The curves of FIGS. 1 and 2 have been drawn, whenever necessary, by interpolation, but this has been required in surprisingly few instances, the results being much more consistent than could have been expected from the very nature of the tests.

The following Examples further illustrate the present invention.

EXAMPLE 1

The polymer used as base for the films in the embodiments is low density polyethylene having a Melt Flow Index of 0.7 to 1.0 gr per 10 minutes at 2.160 Kg and at 190° C. The polymer contained 250-300 ppm of a heat stabiliser known in the art as BHT. The iron compound used was iron dimethyldithiocarbamate and the nickel compound was nickel dibutyldithiocarbamate. They were added to the polymer by including them in master batches having concentrations 5% to 0.5% by weight and blending the masterbatches with the base polymer either in the condition of chips or in the molten state. The tubular blown film extrusion technique, which is conventional in processing polyethylene, was used. Maximum processing temperatures were in the order of 210° C. The film thickness was 30 microns; however tests carried out with greater thicknesses, up to the practical maximum of 100 microns, showed that the behaviour of the material was substantially the same for all the thicknesses in the said range.

The films were then laid out in the field, under complete exposure to irradiation. The following Tables summarise the results of the various embodiments.

Table I illustrates the behaviour of films laid out on the 22nd day of September, at a latitude of 32° North. Column I shows the number of the example; column II the concentration of (trivalent) iron dimethyldithiocarbamate (FeDMDC), the other metal component being nickel dibutyldithiocarbamate (NiDBC) at a constant concentration of 1000 ppm; column III the embrittlement irradiation in mW×min/cmq, and column IV the actual duration of the exposure in days.

Table II is similar to Table I but refers to films laid out on January 1st (same latitude).

Table III shows the behaviour of films having variable concentration of both iron and nickel compounds (which compounds are the same as those of the preceding Tables). Here column II is divided in two parts, column IIa showing the concentration of the iron compound and column IIb that of the nickel compound. The films were laid out on August 26th (same latitude).

Table IV is analogous to Table III but refers to films laid out on March 1st (same latitude).

TABLE I

| I | II | III | IV |
|---|------|------|-----|
| 1 | 5    | 3000 | 218 |
| 2 | 10   | 1920 | 182 |
| 3 | 50   | 1300 | 129 |
| 4 | 100  | 1300 | 129 |
| 5 | 500  | 1040 | 59  |
| 6 | 1000 | 1040 | 59  |
| 7 | 2000 | 1040 | 59  |
| 8 | 3000 | 1040 | 59  |

TABLE II

| I | II | III | IV |
|---|------|------|-----|
| 1 | 10   | 4300 | 180 |
| 2 | 25   | 4300 | 180 |
| 3 | 50   | 2600 | 160 |
| 4 | 100  | 2000 | 125 |
| 5 | 500  | 1700 | 108 |
| 6 | 1000 | 1700 | 108 |
| 7 | 2000 | 1700 | 108 |
| 8 | 3000 | 1700 | 108 |

TABLE III

| I | IIa | IIb | III | IV |
|----|-----|------|------|-----|
| 1  | 50  | 100  | 1950 | 113 |
| 2  | 50  | 500  | 1950 | 113 |
| 3  | 50  | 1000 | 1950 | 113 |
| 4  | 50  | 1500 | 1950 | 113 |
| 5  | 50  | 2000 | 1950 | 113 |
| 6  | 100 | 100  | 1780 | 63  |
| 7  | 100 | 500  | 1815 | 71  |
| 8  | 100 | 1000 | 1815 | 71  |
| 9  | 100 | 1500 | 1815 | 71  |
| 10 | 100 | 2000 | 1815 | 71  |

TABLE IV

| I | IIa | IIb | III | IV |
|---|-----|------|------|-----|
| 1 | 50  | 100  | 2340 | 86  |
| 2 | 50  | 500  | 2340 | 86  |
| 3 | 50  | 1000 | 2340 | 86  |
| 4 | 50  | 1500 | 2900 | 103 |
| 5 | 50  | 2000 | 2900 | 103 |
| 6 | 100 | 100  | 1740 | 77  |

TABLE IV-continued

| I | IIa | IIb | III | IV |
|---|-----|------|------|----|
| 7 | 100 | 500 | 2340 | 86 |
| 8 | 100 | 1000 | 2340 | 86 |
| 9 | 100 | 1500 | 2340 | 86 |
| 10 | 100 | 2000 | 2340 | 86 |

EXAMPLE 2

High density polyethylene (density 0.96 MFI 0.5) containing BHT (400 ppm) and distearyl dithiodipropionate (600 ppm) was compounded with NiDBC (1000 ppm) and FeDMDC (iron dimethyldithiocarbamate) (variable). Films were blown at 200° C. to a thickness from $10\mu$ to $50\mu$. Samples were exposed to UV light (sunlamp/blacklamp combination) to stimulate sunlight and the times for the tear strength to be reduced to the extent that the films tore like tissue paper are given in the following Table.

|   | FeDMDC concentration (ppm) | Time to complete loss of tear strength (hours) |
|---|---|---|
| 1. | 50 | 1170 |
| 2. | 100 | 630 |
| 3. | 200 | 450 |
| 4. | 300 | 390 |
| 5. | 400 | 300 |
| 6. | 500 | 280 |
| 7. | 1000 | 330 |
| 8. | 2000 | 550 |

Parallel results were obtained when identical films were exposed out-of-doors in England beginning in April. 300 Hours in the above Table corresponded to about 60 summer days.

This procedure was repeated except that the concentration of FeDMDC was held constant at 100 ppm and the concentration of the NiDBC was varied. The times to embrittlement are given in the Table below.

|   | Ni DBC conc″ (ppm) | Time to loss of tear strength (hours) |
|---|---|---|
| 1. | 50 | 75 |
| 2. | 100 | 125 |
| 3. | 500 | 445 |
| 4. | 1000 | 655 |
| 5. | 2000 | 1215 |
| 6. | 3000 | 1550 |

EXAMPLE 3

Unstabilised polypropylene was compounded with FeDMDC and NiDBC in a small mixer at 180° C. for 2 mins and converted by compression moulding to film of thickness 0.005 ins. The films were uv irradiated as in Example 2 and the time to embrittlement was measured. The results are given in the table below.

| FeDMDC (ppm) | NiDBC (ppm) | | | | |
|---|---|---|---|---|---|
|  | 0 | 1000 | 2000 | 3000 | 4000 |
|  | Time to Embrittlement | | | | |
| 100 | 116 | 956 | 1515 | 2250 | 2516 |
| 250 | 137 | 619 | 956 | 1740 | 2250 |

EXAMPLE 4

The above example was repeated but using commercially stabilised polypropylene (containing a synergistic thermal stabilising system consisting of Irganox (Registered Trade Mark) 1076/dilaurylthiodipropionate) and the results are given in the following table.

| FeDMDC (ppm) | NiDBC (ppm) | | | | |
|---|---|---|---|---|---|
|  | 0 | 1000 | 2000 | 3000 | 4000 |
|  | Time to Embrittlememt | | | | |
| 100 | 116 | 451 | 1072 | 1410 | 1740 |
| 250 | 256 | 404 | 788 | 1072 | 1515 |

By comparison of Examples 3 and 4 it can be seen that for maximum induction periods before the onset of rapid degradation, unstabilised polypropylene should be used.

EXAMPLE 5

LDPE was processed at 160° C. under the conditions of Example 3 and compression moulded to film of thickness 0.005 ins with various concentrations of iron dibutyldithiocarbamate (FeDBC) and cobalt dibutyldithiocarbamate (CoDBC). The embrittlement times are given in the following table.

| FeDBC (ppm) | CoDBC (ppm) | Embrittlement Time (h) |
|---|---|---|
| 100 | 100 | 719 |
| 100 | 1000 | 1719 |
| 500 | 100 | 692 |
| 500 | 1000 | 1145 |

What we claim is:

1. Plastic composition which is controllably degradable by photooxidation which comprises a vinyl polymer, at least one first complex comprising a non-ionic organosoluble antioxidant complex of iron with a chain-breaking, peroxide-decomposing, metal ion deactivating or ultraviolet light stabilizing compound selected from the group consisting of a dithiocarbamate, dithiophosphate, xanthate, cyclic phosphate, oxime, benzthiazole and benzimidazole, and such that the iron complex is a photoactivator and is present in a concentration of about 0.0005 to 0.5% by weight, and at least one second complex comprising a non-ionic organosoluble ultraviolet light stabilizing complex of nickel or cobalt with a chain-breaking, peroxide-decomposing, metal ion deactivating or ultraviolet light stabilizing compound selected from the group consisting of a dithiocarbamate, dithiophosphate, xanthate, cyclic phosphate, oxime, benzthiazole and benzimidazole, and such that the nickel or cobalt complex is a photostabilizer and is present in a concentration of about 0.01 to 0.5% by weight, the concentrations of the iron complex and nickel or cobalt complex being independently varied relative to each other yet coordinated to produce a controllably desired ultraviolet photodegradation embrittlement time for the composition, which embrittlement time is capable of being retarded or delayed by controlling the length of the induction period defining the interval between the start of exposure to photodegrading ultraviolet light and the point at which ultraviolet photodegradation by photooxidation begins in dependence upon the controllable amount of the nickel or cobalt complex in relation to the amount of the iron complex, and which composition upon reaching the end of the induction period and the point at which ultraviolet photodegradation by photooxidation begins is capable of undergoing photodegradation at a correspondingly comparatively rapid photooxidation rate to ultimate embrittlement in dependence upon the controllable amount of the iron complex in relation to the amount of the nickel or cobalt complex, said composition being such that at a concentration ratio by weight of about 1:1 of the nickel or cobalt complex to the iron complex the embrittlement time thereof is at least about 125 hours after exposure to photodegrading ultraviolet light.

2. Composition of claim 1, wherein the iron complex is present in a concentration of about 0.001 to 0.05% by weight and the nickel or cobalt complex is present in a concentration of about 0.1 to 0.2% by weight.

3. Composition of claim 1, wherein the iron complex and the nickel or cobalt complex are derived from an alkyldithiocarbamate.

4. Composition of claim 1, further including an antioxidant stabilizer.

5. Composition of claim 1, wherein the composition is in the form of a film.

6. Composition of claim 1, wherein the composition is in the form of a protective or mulching film.

7. Composition of claim 1, wherein the composition is in the form of a film which is about 30 to 100 microns thick.

8. Composition of claim 1, wherein at a concentration ratio by weight of about 10:1 of the nickel or cobalt complex to the iron complex the embrittlement time thereof is at least about 71 days after exposure to photodegrading ultraviolet light.

* * * * *